United States Patent [19]

Eino

[11] Patent Number: 4,847,684

[45] Date of Patent: Jul. 11, 1989

[54] COLOR IMAGE SENSING APPARATUS WITH MEANS FOR ALTERNATELY EXTRACTING FIRST AND SECOND COLOR DIFFERENCE SIGNALS INCLUDING A FIRST-IN FIRST-OUT DIGITAL LINE MEMORY

[75] Inventor: Teruo Eino, Hachioji, Japan

[73] Assignee: Olympus Optical Co., Ltd., Tokyo, Japan

[21] Appl. No.: 62,225

[22] Filed: Jun. 11, 1987

[30] Foreign Application Priority Data

Jun. 20, 1986 [JP] Japan ................................ 61-144515

[51] Int. Cl.[4] ...................... H04N 9/077; H04N 9/04; H04N 9/64
[52] U.S. Cl. ........................................ 358/44; 358/40; 358/41
[58] Field of Search ...................... 358/41, 43, 44, 31, 358/40, 44

[56] References Cited

U.S. PATENT DOCUMENTS

| | | | |
|---|---|---|---|
| 4,403,247 | 9/1983 | Sone et al. | 358/44 |
| 4,464,675 | 8/1984 | Balaban et al. | 358/31 |
| 4,477,832 | 10/1984 | Takemura | 358/44 |
| 4,646,151 | 2/1987 | Welles et al. | 358/31 |
| 4,697,208 | 9/1987 | Eino | 358/44 |
| 4,700,220 | 10/1987 | Yasuda et al. | 358/44 |
| 4,734,759 | 3/1988 | Kobori et al. | 358/44 |
| 4,794,448 | 12/1988 | Takizawa | 358/44 |

FOREIGN PATENT DOCUMENTS

| | | | |
|---|---|---|---|
| 0156265 | 10/1985 | European Pat. Off. | 358/44 |
| 2537818 | 7/1984 | France | 358/40 |

OTHER PUBLICATIONS

L. M. Metzger, "Comb Filter", *Research Disclosure*, No. 153, Jan. 1977, pp. 34-35.
Steve Barton, "A Practical Charge-Coupled Device Filter for the Separation of Luminance and Chrominance Signals in a Television Receiver", *IEEE Transactions on Consumer Electronics*, vol. CE-23, No. 3, Aug. 1977, pp. 342-354.
Ulrich Tietze et al., *Halbleiter-Schaltungstechnik*, Sixth Edition, Springer-Verlag, 1983, pp. 288-293.
William Morris, Editor, *The American Heritage Dictionary of the English Language*, American Heritage Publishing Co., Inc., and Houghton Mifflin Company, 1969-1975, p. 987, "Photogene".
Yoshiaki Sone et al., "A Single Chip CCD Color Camera System Using Field Integration Mode", *Nippon Television Gakkai-Shi*, vol. 37, No. 10, (1983), pp. 856-862.

*Primary Examiner*—Edward L. Coles, Sr.
*Assistant Examiner*—Randall S. Svihla
*Attorney, Agent, or Firm*—Frishauf, Holtz, Goodman & Woodward

[57] ABSTRACT

A color image sensing apparatus includes a solid-state image sensing element having a color separation filter, a circuit for extracting a color difference signal from an output of the solid-state image sensing element, first and second color difference signals which are alternately extracted for every scanning line, and a delay-type line memory for storing an output signal from the color difference signal extraction circuit and for reading out a stored signal after one horizontal scanning period. The line memory is a first-in first-out type digital memory having a delay time corresponding to one horizontal scanning period. A circuit is provided for outputting the first and second color difference signals for every one horizontal scanning line, based on the output signal from the color difference signal extraction circuit and the output signal from the line memory. In this manner, the first and second color difference signals can be output not alternately, but simultaneously for every one horizontal scanning line. The delay time of the line memory is varied in accordance with the number of pixels in the solid-state image sensing element. Frame memories can be used to store the output signal of the color difference signal extraction circuit and a wideband luminance signal which is extracted from the output of the solid-state image sensing element.

10 Claims, 4 Drawing Sheets

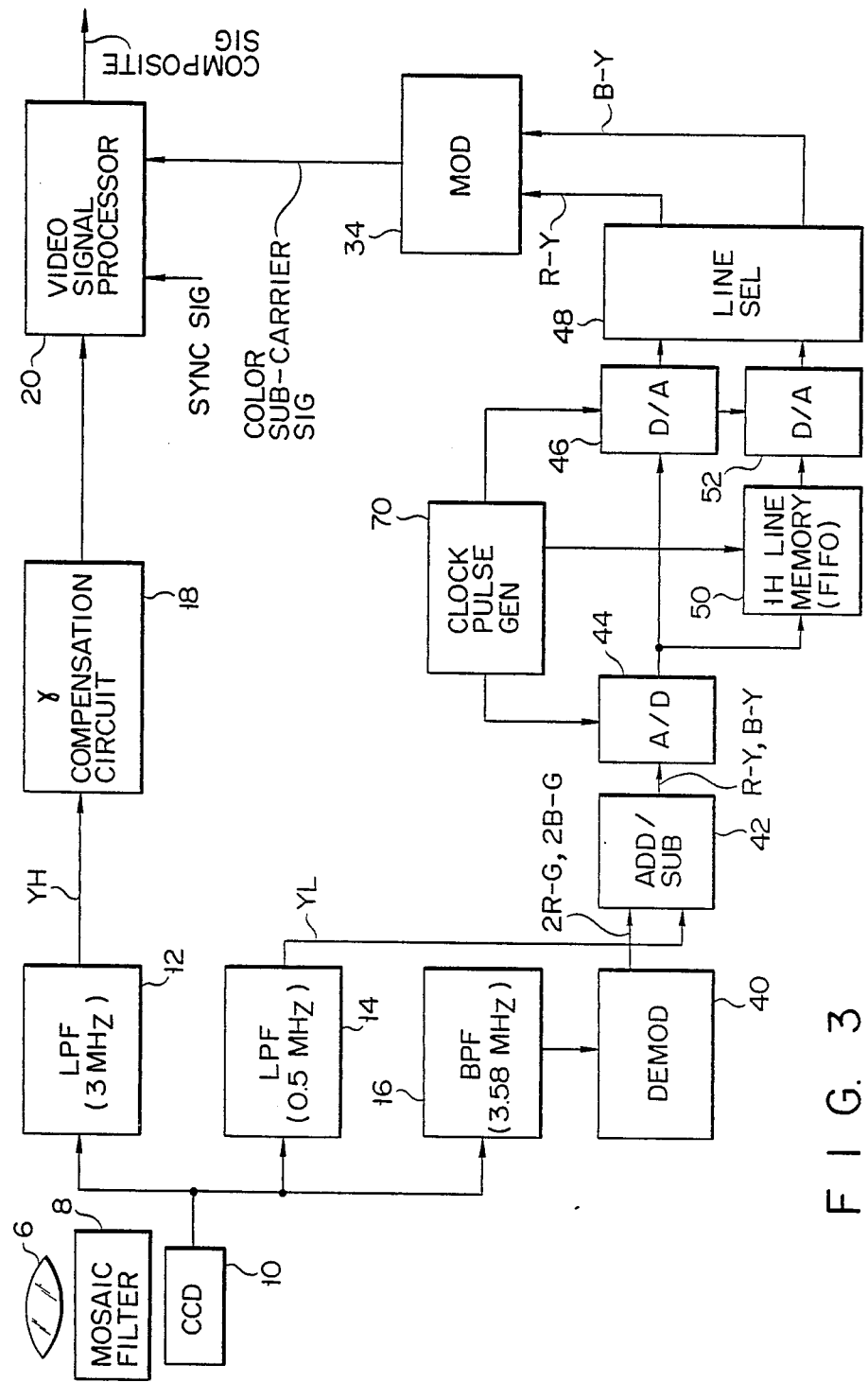
F I G. 3

COLOR IMAGE SENSING APPARATUS WITH MEANS FOR ALTERNATELY EXTRACTING FIRST AND SECOND COLOR DIFFERENCE SIGNALS INCLUDING A FIRST-IN FIRST-OUT DIGITAL LINE MEMORY

BACKGROUND OF THE INVENTION

The present invention relates to a color image sensing apparatus and, more particularly, to a color image sensing apparatus using a single solid-state image sensing element or image pickup tube.

In order to realize a color image sensing apparatus using a single image pickup tube or solid-state image sensing element, a color separation filter, in which a plurality of colors of filter elements are arranged in a mosaic or stripe form, must be provided on an image sensing surface, so as to separate an image signal of one frame into a plurality of color component signals. Two types of color separation filters are known: a primary color separation filter using a combination of the primary colors of red (R), green (G), and blue (B), and a complementary color separation filter using a combination of complementary colors of yellow (Ye: transmitting R and G) and cyan (Cy: transmitting B and G), and white (W: transmitting R, G, and B; in other words, transparent) or G. Since the latter type filter has a higher transmittance than that of the former type, it has the advantages of high sensitivity and resolution.

As a conventional single-plate color image sensing apparatus using the complementary color separation filter, an apparatus described in "A Single Chip CCD Color Camera System Using Field Integration Mode" (Sone, Ishikawa, Hashimoto, Kuroda, Ohkubo) *Nippon Television Gakkai-Shi,* Vol. 37, No. 10 (1983), pp. 856-862, is known. In the field accumulation mode, signal charges are accumulated over one field period (1/60 sec) by a single photodiode. This mode can eliminate an afterimage and flickering, in contrast with a frame accumulation mode in which signal charges are accumulated over one frame period (1/30 sec) by a single photodiode.

FIG. 1 is a block diagram of the prior art apparatus. An optical image of an object incident through image sensing lens 6 is incident on an image sensing surface of CCD (Charge Coupled Device) 10, as a solid-state image sensing element, through mosaic filter 8 as a color separation filter.

FIG. 2 shows the structure of mosaic filter 8. Mosaic filter 8 is a complementary color filter comprising combinations of 2×4 filter elements of cyan-yellow, magenta-green, yellow-cyan; and magenta-green. With this structure, pixel data (data of two adjacent pixels in the vertical direction) for two lines (horizontal lines) are read as an image signal for one horizontal scanning line, and the two horizontal lines for A (first or odd) and B (second or even) fields are shifted by one line in the vertical direction. The arrangement of the pixels of the mosaic filter is determined so that the same luminance signals are obtained for each field and each line, and at least two different color component data can be obtained from one horizontal scanning line if two adjacent pixels in the vertical direction are read as one pixel. The reason why the arrangement in the horizontal direction is repeated for every two columns is to maintain the frequency band of a luminance signal.

For this purpose, a luminance signal consisting of the following color components is output as a horizontal scanning line signal:

$$(Cy + Ye) + (Mg + G) =$$
$$(B + G + R + G) + (R + B + G) =$$
$$2R + 3G + 2B \quad (1)$$

An output signal from CCD 10 is supplied to low-pass filters (LPFs) 12 and 14 and to bandpass filter (BPF) 16. Pass bands of LPFs 12 and 14 are respectively set to be 3 MHz and 0.5 MHz. BPF 16 has a central frequency of 3.58 MHz and a bandwidth of about 1 MHz. Wide-band luminance signal YH and and narrow-band luminance signal YL are respectively output from LPFs 12 and 14.

Luminance signal YH is supplied to video signal processor 20 via γ compensation circuit 18.

Luminance signal YL is supplied to the second input terminals of addition/subtraction circuits 30 and 32.

The output from BPF 16 is supplied to demodulator 22, and is also supplied to demodulator 28 via one-horizontal-scanning-period (1H) delay line 26. A glass delay play utilizing ultrasonic vibration is adopted as 1H delay line 26. Demodulators 22 and 28 subtract odd column signals from even column signals. Thus, demodulator 22 alternately outputs the following color signal as a horizontal scanning line signal for every line.

In the nth line in FIG. 2, the following color signal can be obtained:

$$(Cy + Mg) - (Ye + G) =$$
$$(B + G + R + B) - (R + G + G) =$$
$$2B - G \quad (2)$$

In the (n+1)th line in FIG. 2, the following color signals can be obtained:

$$(Ye + Mg) - (Cy + G) =$$
$$(R + G + R + B) - (B + G + G) =$$
$$2R - G \quad (3)$$

Since the input signal to demodulator 22 is input to demodulator 28, to be delayed by 1H, demodulator 28 outputs color signal 2R-G in the nth line and color signal 2B-G in the (n+1)th line, contrarily to demodulator 22.

The outputs from demodulators 22 and 28 are supplied to line selector 24. Line selector 24 has two input terminals and two output terminals, and alternately outputs first and second input signals from first and second output terminals for every 1H. As a result, the first output terminal of line selector 24 always outputs color signal 2R-G, and the second output terminal always outputs color signal 2B-G.

First output signal 2R-G is supplied to the first input terminal of addition/subtraction circuit 30, and second output signal 2B-G is supplied to the first input terminal of addition/subtraction circuit 32. Circuits 30 and 32 add or subtract luminance signal YL and these color signals, after multiplying with suitable coefficients, and respectively generate color difference signals R-Y and B-Y. The outputs from circuits 30 and 32 are supplied to modulator 34, and are modulated at a central frequency of 3.58 MHz, thereby outputting a color sub-carrier signal. The color sub-carrier signal is supplied to video processor 20.

Video processor 20 produces a composite signal based on the color sub-carrier signal, luminance signal YH output from circuit 18, and a sync signal.

As has been described above, in the conventional apparatus, first and second color signals 2R-G and 2B-G are alternately output for every 1H from demodulator 22 or 28. 1H delay line 26 must be used so that both the first and second signals can be output for every 1H.

Since the glass delay plate is used as 1H delay line 26, a signal at a frequency other than the predetermined central frequency (in this case, 3.58 MHz) cannot be accurately delayed by 1H.

Recently, various types of solid-state image sensing elements having different numbers of pixels have been developed. If the number of pixels is changed, the demodulation frequency of a color signal is also changed, and hence, 1H (time) is changed accordingly. However, suitable glass delay plates are rarely available.

SUMMARY OF THE INVENTION

The present invention has been developed in consideration of the above situation, and has as its object to provide a single-tube or single-plate type color image sensing apparatus having a color separation filter, wherein a change in number of pixels and in demodulation frequency of a color signal can be easily compensated for when first and second color signals alternately output from demodulators for every 1H are subjected to signal processing, so that first and second color difference signals can be output not alternately but simultaneously for every 1H.

A color image sensing apparatus according to the present invention comprises a solid-state image sensing element having a color separation filter, a circuit for extracting a color difference signal from an output of the solid-state image sensing element, first and second color difference signals being alternately extracted for every horizontal scanning period, a line memory for storing an output signal from the color difference signal extraction circuit and reading out a stored signal after one horizontal scanning period, and a circuit for outputting the first and second color difference signals for every one horizontal scanning period, based on the output signal from the color difference signal extraction circuit and the output signal from the line memory.

BRIEF DESCRIPTION OF THE DRAWINGS

FIG. 3 is a block diagram of a color image sensing apparatus according to a first embodiment of the present invention.

DETAILED DESCRIPTION OF THE PREFERRED EMBODIMENTS

A color image sensing apparatus according to an embodiment of the present invention will now be described with reference to the accompanying drawings.

Figure 1:
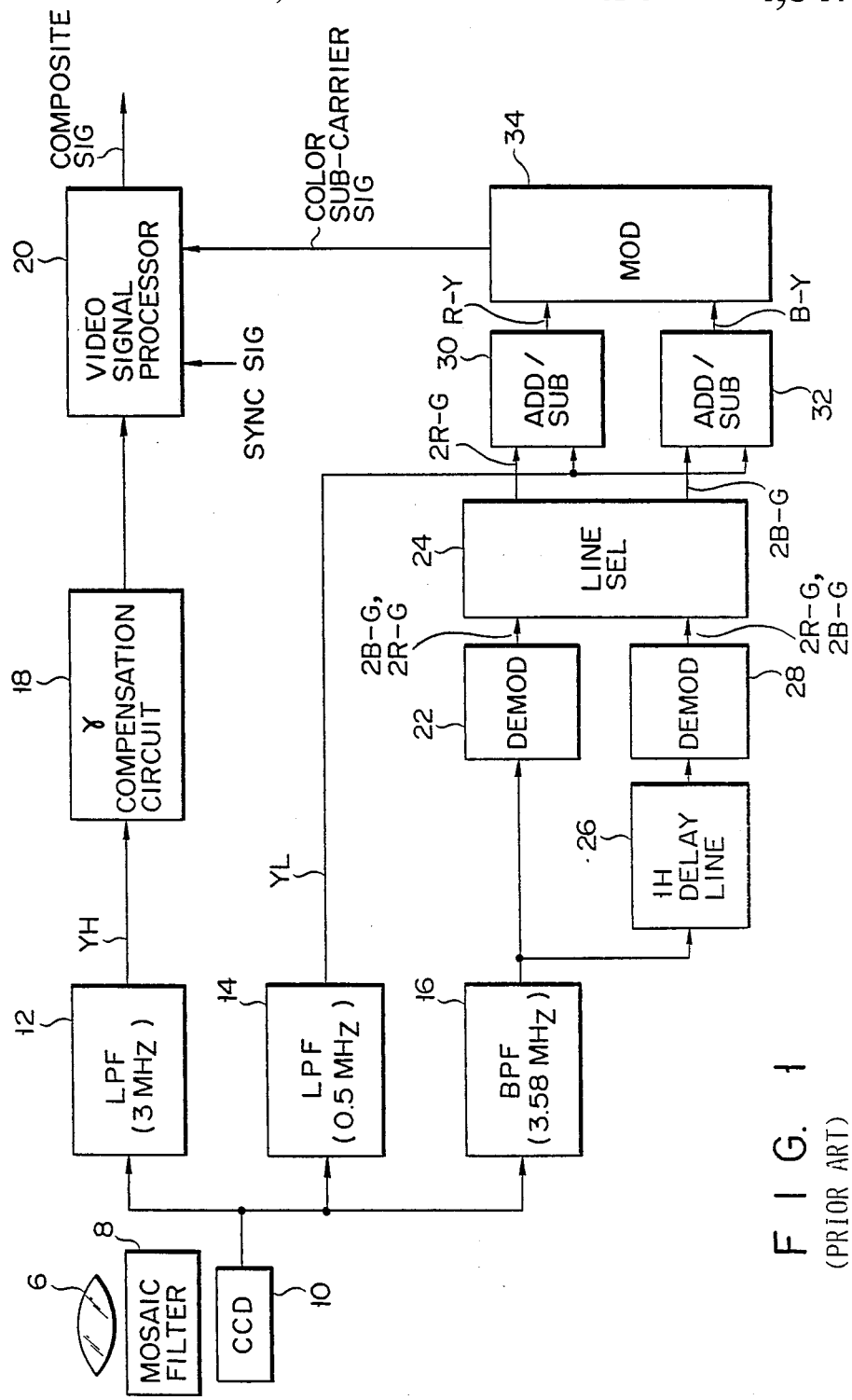
FIG. 1 is a block diagram showing a conventional color image sensing apparatus.
Figure 2:
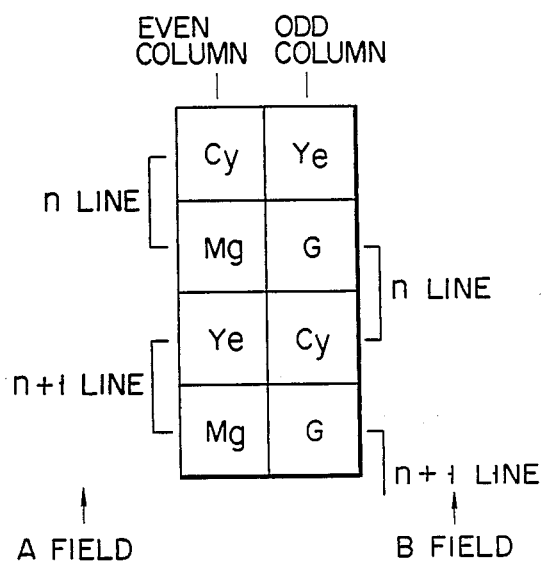
FIG. 2 is a view showing a structure of a color separation filter used in the color image sensing apparatus shown in FIG. 1.

FIG. 3 is a block diagram of a first embodiment of the present invention. The same reference numerals in FIG. 3 denote the same parts as in FIG. 1. In the first embodiment, the filter shown in FIG. 2 is used as mosaic filter 8. An output from BPF 16 is supplied to demodulator 40. Demodulator 40 subtracts odd column signals from even column signals and outputs a difference signal. For this reason, demodulator 40 outputs color signal 2R-G in the nth line and color signal 2B-G in the (n+1)th line.

The output from demodulator 40 is input to the first input terminal of addition/subtraction circuit 42, and narrow-band luminance signal YL output from LPF 14 is input to the second terminal thereof. Circuit 42 adds or subtracts luminance signal YL and these color signals after multiplying with proper coefficients, and generates color difference signal R-Y in the nth line and color difference signal B-Y in the (n+1)th line.

The output from circuit 42 is supplied to analog-to-digital (A/D) converter 44. The output from A/D converter 44 is supplied to digital-to-analog (D/A) converter 46, and is also supplied to D/A converter 52 through line memory 50. Line memory 50 is a FIFO (first-in, first-out) type digital memory having a capacity corresponding to data for one horizontal scanning line, and corresponds to a conventional 1H delay line. More specifically, a time difference from when data is written in memory 50 until the data is read out therefrom is set to be 1H. The time difference can be desirably changed by changing the clock frequency of clock pulse generator 70 for generating clock pulses for A/D converter 44, line memory 50 and D/A converters 46 and 52. More specifically, the clock frequency of generator 70 is changed in accordance with a change in demodulation frequency of the color signal upon a change in number of pixels of CCD 10.

The outputs from D/A converters 46 and 52 are respectively supplied to the first and second input terminals of line selector 48. Line selector 48 has the first and second output terminals and alternately outputs first and second input signals from the first and second output terminals for every 1H. More specifically, in the nth line, selector 48 respectively outputs signal R-Y as the output from A/D converter 44 and signal B-Y as the output from line memory 50 from the first and second output terminals, and in the (n+1)th line, respectively outputs signal B-Y as the output from A/D converter 44 and signal R-Y as the output from line memory 50 from the second and first output terminals. For this reason, line selector 48 always outputs color difference signal R-Y from the first output terminal and color difference signal B-Y from the second output terminal.

Note that the first input terminal of line selector 48 can receive the output signal from addition/subtraction circuit 42 without modification, and D/A converter 46 can be omitted.

The outputs from line selector 48 are supplied to modulator 34, and are modulated at a central frequency of 3.58 MHz, thereby outputting a color sub-carrier signal. The color sub-carrier signal is supplied to video processor 20.

Video processor 20 produces a composite signal based on the color sub-carrier signal, wide-band luminance signal YH output from γ compensation circuit 18, and a sync signal.

According to the first embodiment, the first and second color difference signals R-Y and B-Y alternately output from circuit 42 for every 1H are A/D-converted and are passed through digital memory (line memory)

50 to be delayed by 1H. Even if the number of pixels of CCD 10 is changed and hence the demodulation frequency of the color signal is changed, the delay time can be easily changed by adjusting the operating speed of line memory 50, and a 1H delay time can be accurately obtained. If the number of pixels of CCD 10 is increased, the clock frequency of the line memory can be increased; if the number of pixels is decreased, the clock frequency can be decreased.

Figure 4:
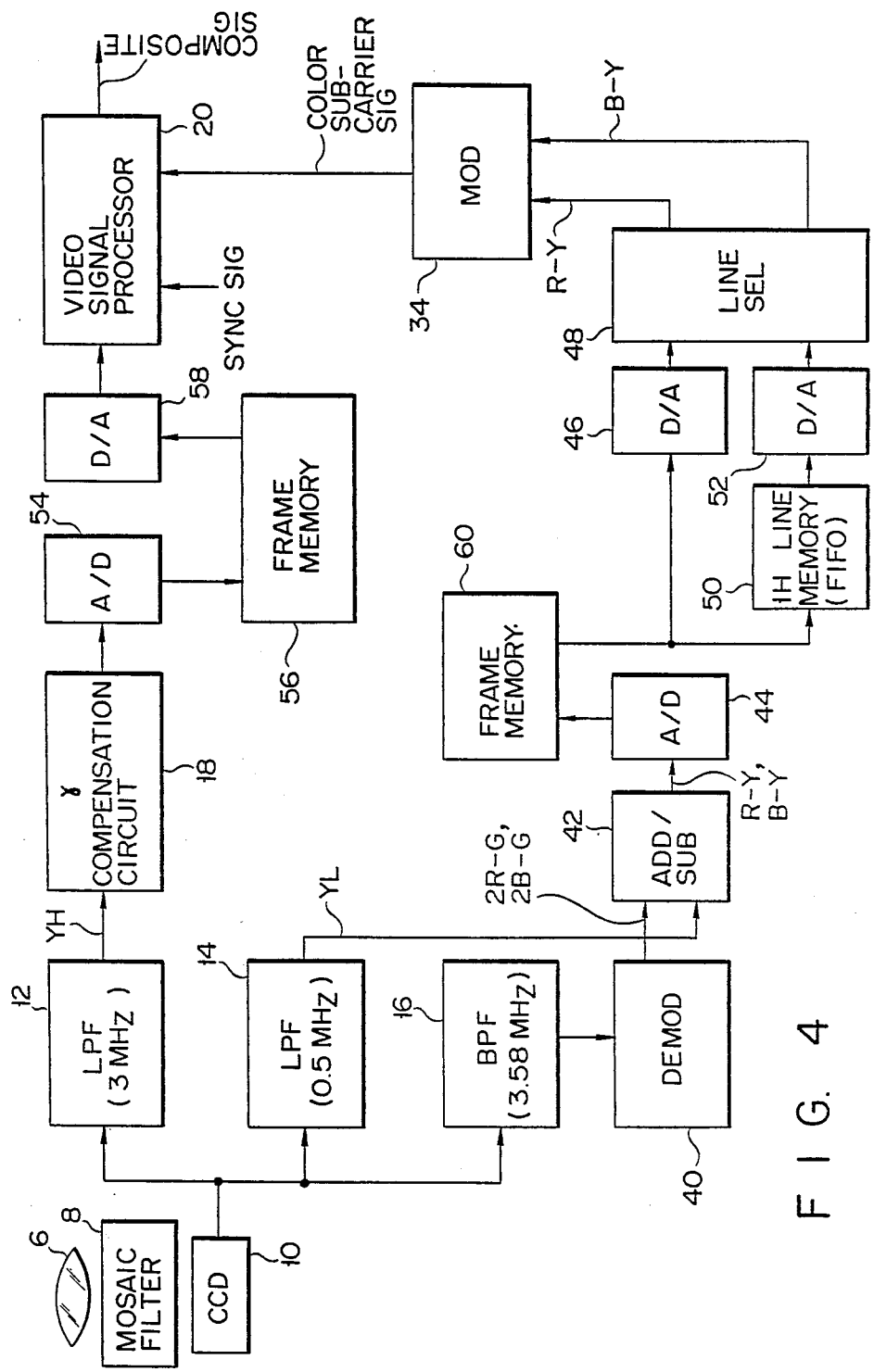
FIG. 4 is a block diagram of a color image sensing apparatus according to a second embodiment of the present invention.

FIG. 4 is a block diagram showing a color image sensing apparatus according to a second embodiment of the present invention. The same reference numerals in FIG. 4 denote the same parts as in FIG. 3. Wide-band luminance signal YH output from γ compensation circuit 18 is written in luminance signal frame memory 56 through A/D converter 54. A signal read out from frame memory 56 is supplied to video processor 20 through D/A converter 58. Frame memory 56 is adopted to interrupt a write access if required to display a still image. In a system for the color difference signals, color difference signal frame memory 60 is connected to the output terminal of A/D converter 44. A signal read out from frame memory 60 is applied to D/A converter 46, and is also supplied to D/A converter 52 through line memory 50. The other arrangements of the second embodiment are the same as those in the first embodiment.

Since first and second color difference signals R-Y and B-Y alternately output from addition/subtraction circuit 42 for every 1H is written in frame memory 60, the memory capacity can be reduced to half that of a case wherein both first and second color difference signals R-Y and B-Y output from line selector 48 for every 1H are stored.

The present invention is not limited to the above embodiments. For example, image sensing means is not limited to a solid-state image sensing element but can be an image pickup tube. The arrangement of the mosaic filter and the readout mode are not limited to those described above. The present invention can be applied to apparatuses which delay each scanning line signal and thereafter synthesize an original signal and the delayed signal to synchronously obtain two color difference signals when only one color difference signal can be obtained for each scanning line.

According to the present invention as described above, a color image sensing apparatus can be provided. In this apparatus, first and second color difference signals alternately output for every 1H and another pair of first and second color difference signals which are delayed by 1H through the line memory are supplied to the line selector, and the first and second color difference signals are simultaneously output for every 1H. For this reason, even if the demodulation frequency of the color difference signal is changed, this can be coped with by only changing the clock frequency of the line memory.

What is claimed is:

1. A color image sensing apparatus, comprising:
   image sensing means having a color separation filter;
   color difference signal extraction means for alternately extracting first and second color difference signals from an output of said image sensing means during successive horizontal scanning periods of the image sensing means and for producing an output signal including the alternately-extracted first and second color difference signals;
   line memory means comprising a first-in first-out digital memory for storing the output signal of said color difference signal extraction means and for reading out the stored output signal after one horizontal scanning period of the image sensing means; and
   color difference signal output means for simultaneously outputting the first and second color difference signals alternately extracted during two successive horizontal scanning periods of the image sensing means based on the output signal of said color difference signal extraction means and the stored output signal read out by said line memory means.

2. An apparatus according to claim 1, in which
   said color separation filter comprises color filter elements disposed on respective pixels of the image sensing means, wherein the color filter elements are divided into groups each containing eight color filter elements arranged as four horizontal rows respectively containing two color filter elements of cyan and yellow, magenta and green, yellow and cyan, and magenta and green; and
   said image sensing means includes means for producing an output including data from two vertically-adjacent pixels as data for one pixel, wherein the two vertically-adjacent pixels are shifted respectively up and down by one pixel in the vertical direction during odd and even fields of the image sensing means.

3. An apparatus according to claim 1, in which
   said image sensing means comprises columns of pixels; and
   said color difference signal extraction means comprises:
   first filter means for extracting a narrowband luminance signal from the output of said image sensing means;
   second filter means for extracting a color signal including odd column pixel signals and even column pixel signals from the output of said image sensing means;
   demodulation means responsive to the color signal for subtracting odd column pixel signals from even column pixel signals so as to alternately generate first and second color signals during successive horizontal scanning periods of the image sensing means; and
   means for alternately generating the first and second color difference signals during successive horizontal scanning periods of the image sensing means in accordance with the alternately-generated first and second color signals and the narrow-band luminance signal.

4. An apparatus according to claim 1, in which
   said color difference signal output means comprises:
   a first input terminal connected to an output terminal of said color difference signal extraction means;
   a second input terminal connected to an output terminal of said line memory means;
   first and second output terminals; and
   selector means for alternately connecting said first and second input terminals to said first and second output terminals during successive horizontal scanning periods of the image sensing means.

5. An apparatus according to claim 1, further comprising:

clock pulse generating means coupled to said line memory means wherein the frequency of the clock pulses is varied in accordance with a number of pixels in said image sensing means.

6. An apparatus according to claim 1, further comprising:
   extraction means for extracting a wide-band luminance signal from the output of said image sensing means;
   modulation means for generating a color sub-carrier signal from the first and second color difference signals output by the color difference signal output means; and
   means for generating a composite signal from the wide-band luminance signal and the color sub-carrier signal.

7. An apparatus according to claim 6, further comprising:
   a first frame memory for storing the wide-band luminance signal; and
   a second frame memory for storing the output signal of said color difference signal extraction means.

8. An apparatus according to claim 6, further comprising:
   a compensation circuit for compensating the wide-band luminance signal.

9. A color image sensing apparatus, comprising:
   image sensing means having a color separation filter;
   color difference signal extraction means for alternately extracting first and second color difference signals from an output of said image sensing means during successive horizontal scanning periods of the image sensing means and for producing an output signal including the alternately-extracted first and second color difference signals;
   line memory means for storing the output signal of said color difference signal extraction means and for reading out the stored output signal after one horizontal scanning period of the image sensing means;
   color difference signal output means for simultaneously outputting the first and second color difference signals alternately extracted during two successive horizontal scanning periods of the image sensing means based on the output signal of said color difference signal extraction means and the stored output signal read out by said line memory means;
   extraction means for extracting a wide-band luminance signal from the output of said image sensing means;
   modulation means for generating a color sub-carrier signal from the first and second color difference signals output by the color difference signal output means;
   means for generating a composite signal from the wide-band luminance signal and the color sub-carrier signal;
   a first frame memory for storing the wide-band luminance signal; and
   a second frame memory for storing the output signal of said color difference signal extraction means.

10. An apparatus according to claim 9, further comprising:
    a compensation circuit for compensating the wide-band luminance signal.

* * * * *